United States Patent
Bandyopadhyay et al.

(10) Patent No.: US 7,109,139 B2
(45) Date of Patent: Sep. 19, 2006

(54) PROCESS FOR MANUFACTURE OF DENSE NEODYMIUM STABILIZED β-SI₃N₄ -α-SIALON COMPOSITE

(75) Inventors: Siddhartha Bandyopadhyay, West Bengal (IN); Himadri Sekhar Maity, West Bengal (IN)

(73) Assignee: Council of Scientific and Industrial Research, New Delhi (IN)

( * ) Notice: Subject to any disclaimer, the term of this patent is extended or adjusted under 35 U.S.C. 154(b) by 61 days.

(21) Appl. No.: 10/974,016

(22) Filed: Oct. 27, 2004

(65) Prior Publication Data

US 2006/0089250 A1  Apr. 27, 2006

(51) Int. Cl.
*C04B 35/596* (2006.01)
*C04B 35/599* (2006.01)

(52) U.S. Cl. .................. 501/97.2; 501/97.4; 501/98.2; 501/98.3; 264/683

(58) Field of Classification Search ............... 501/97.2, 501/97.4, 98.2, 98.3; 264/683
See application file for complete search history.

(56) References Cited

U.S. PATENT DOCUMENTS

| | | | | | |
|---|---|---|---|---|---|
| 4,421,528 | A | * | 12/1983 | Buljan et al. ................. | 51/309 |
| 5,032,553 | A | * | 7/1991 | Tarry ......................... | 501/98.2 |
| 5,413,972 | A | * | 5/1995 | Hwang et al. ............. | 501/98.2 |
| 5,908,798 | A | * | 6/1999 | Chen et al. ................ | 501/98.2 |
| 6,824,727 | B1 | * | 11/2004 | Roy et al. ................... | 264/414 |

* cited by examiner

*Primary Examiner*—Karl Group
(74) *Attorney, Agent, or Firm*—Nixon & Vanderhye P.C.

(57) ABSTRACT

The present invention provides a process for the manufacture of dense neodymium stabilized $\beta$-Si$_3$N$_4$-$\alpha$-SiAlON composite, wherein a synergistic composition essentially consisting of Si$_3$N$_4$, Al$_2$O$_3$, AlN, SiO$_2$ and Nd$_2$O$_3$ as starting materials is mixed in proportion to make a total of 100 mole in the mixed batch, passing the powder through 100 mesh, pressing the powder to form green compacts, sintering the green compacts at a temperature in the range of 1700° to 1900° C. in nitrogen atmosphere. The process of the present invention provides neodymium stabilized $\beta$-Si$_3$N$_4$-$\alpha$-SiAlON composites by processing a composition from the system Si$_3$N$_4$—Al$_2$O$_3$.AlN—Nd$_2$O$_3$.9AlN—SiO$_2$ resulting into dense product of the order of >98% theoretical density with the advantages such as cost effectiveness, high hardness and high fracture toughness. The produced dense $\beta$-Si$_3$N$_4$-$\alpha$-SiAlON will be useful for low temperature applications such as wear parts like bearing and roller materials and particularly for grinding and milling operations like grinding balls.

8 Claims, No Drawings

PROCESS FOR MANUFACTURE OF DENSE NEODYMIUM STABILIZED β-Si₃N₄ -α-SIALON COMPOSITE

RELATED APPLICATION

This application is related to our co-pending application Ser. No. 10/974,013 filed Oct. 27, 2004.

FIELD OF THE INVENTION

The present invention relates to a process for the manufacture of dense neodymium stabilised $\beta$-$Si_3N_4$-$\alpha$-SiAlON composite. Dense $\beta$-$Si_3N_4$-$\alpha$-SiAlON composite manufactured by the process of the present invention will find usage in low temperature applications such as wear parts like bearing and roller materials and particularly for grinding and milling operations like grinding balls.

BACKGROUND OF THE INVENTION

It is known in the art to hot pressing green mixtures of $Si_3N_4$, AlN, $Al_2O_3$ and $Nd_2O_3$, at a temperature in the range of 1550° to 1750° C., and at a pressure of about 20 MPa (Wang et al. in Mater. Res. Soc. Symp. Proc., Vol. 287, 1993, pp. 387–392 titled "Formation and densification of R-α' SiAlONs (R=Nd,Sm,Gd, Dy,Er,Yb)"). Shen et al. (J. Am. Ceram. Soc., Vol. 79, No. 3, 1996, pp. 721–32 titled "Homogeneity region and thermal stability of neodymium—doped α SiAlON ceramics") teach hot pressing to fabricate the material as stated above.

O'Reilly et al. (Mater. Res. Soc. Symp. Proc., Vol. 287, 1993, pp. 393–398 titled "Parameters affecting pressureless sintering of α' SiAlONs with lanthanide modifying cations") discloses that green mixture containing similar starting materials as above were pressureless sintered but yielded only 50% α-SiAlON in the sintered product. Kall et al. (J. Eur. Ceram. Soc., Vol. 6, 1990, pp. 191–27, titled "Sialon ceramics made with mixtures of $Y_2O_3$— $Nd_2O_3$ as sintering aids") discloses that green mixtures were pressureless sintered above 1825° C. Although the high temperature firing could produce fully sintered material, the pressureless sintering at 1750° C. could only produce up to 96% of theoretical density even when α-SiAlON is completely absent.

The major drawbacks of the above noted hitherto known processes are that these involve selection of a composition that requires hot pressing for full densification, which is evidently expensive. It is also difficult to manufacture a complex-shaped material and also failed to produce high densification under pressure less sintering method.

Thus, there is a need to provide a composition for preparation of dense neodymium stabilised $\beta$-$Si_3N_4$-$\alpha$-SiAlON composite, which overcome the above disadvantages.

OBJECTS OF THE INVENTION

The main object of the present invention is to provide a process for the manufacture of dense neodymium stabilised $\beta$-$Si_3N_4$-$\alpha$-SiAlON composite, which obviates the drawbacks of the hitherto known prior art.

Another object of the present invention is to provide a process of making dense Neodymium stabilised $\beta$-$Si_3N_4$-$\alpha$-SiAlON composite, wherein the sintered material prepared will display high hardness which will make it ideal for use as engineering components in areas where abrasive wear is dominant.

Yet another object of the present invention is to provide a process of making dense Neodymium stabilised $\beta$-$Si_3N_4$-$\alpha$-SiAlON composite, wherein the sintered material prepared will display important mechanical properties like fracture toughness which is acceptable for the use as engineering components.

Still another object of the present invention is to provide a process of manufacture of dense neodymium stabilized $\beta$-$Si_3N_4$-$\alpha$-SiAlON, wherein the composition of α-SiAlON is taken from the system $Si_3N_4$—$Al_2O_3$.AlN—$Nd_2O_3$.9AlN—$SiO_2$ to obtain dense sintered $\beta$-$Si_3N_4$-$\alpha$-SiAlON, using $Si_3N_4$, $Al_2O_3$, $A_2N$, $SiO_2$ and $Nd_2O_3$ as starting materials which form a synergistic composition as described and claimed in our co-pending patent application Ser. No. 10/974.013.

Still yet another object of the present invention is to provide a process of manufacture of dense neodymium stabilised $\beta$-$Si_3N_4$-$\alpha$-SiAlON composite, wherein the composition of α-SiAlON is taken from the system $Si_3N_4$—$Al_2O_3$.AlN—$Nd_2O_3$.9AlN —$SiO_2$ to obtain dense sintered $\beta$-$Si_3N_4$-$\alpha$-SiAlON, using $Si_3N_4$, $Al_2O_3$, AlN, $SiO_2$ and $Nd_2O_3$ as starting materials.

SUMMARY OF THE INVENTION

The present invention provides a process for the manufacture of dense neodymium stabilised $\beta$-$Si_3N_4$-$\alpha$-SiAlON composite, wherein a synergistic composition essentially consisting of $Si_3N_4$, $Al_2O_3$, AlN, $SiO_2$ and $Nd_2O_3$ as starting material is mixed in proportion to make a total of 100 mole in a mixed batch, passing the powder through 100 mesh, pressing the powder to form green compacts, sintering the green compacts at a temperature in the range of 1700° to 1900° C. in nitrogen atmosphere. The process of the present invention provides neodymium stabilised $\beta$-$Si_3N_4$-$\alpha$-SiAlON composites by processing a composition from the system $Si_3N_4$—$Al_2O_3$.AlN—$Nd_2O_3$.9AlN—$SiO_2$ resulting into dense product of the order of >98% theoretical density with the advantages such as cost effectiveness, high hardness and high fracture toughness.

Accordingly, the present invention provides a process for the manufacture of dense neodymium stabilised $\beta$-$Si_3N_4$-$\alpha$-SiAlON composite, which comprises preparing a homogeneous powdered mixture essentially consisting of: 49 to 63 mole % $Si_3N_4$, 2.5 to 3.5 mole % $Al_2O_3$, 29 to 43 mole % AlN, 2.1 to 2.9 mole % $SiO_2$ and 3.1 to 4.9 mole % $Nd_2O_3$, mixed in proportion to make a total of 100 mole to obtain a mixed powdered batch, passing the powdered batch through 100 mesh followed by drying, pressing the sieved and dried powder to form green compacts, subjecting the green compacts so obtained to sintering to obtain the dense neodymium stabilised $\beta$-$Si_3N_4$-$\alpha$-SiAlON composite.

In one embodiment of the invention, the sintering of the green compacts is carried out at a temperature in the range of 1700° to 1900° C., in nitrogen atmosphere In another embodiment of the invention, the starting materials used are pure and powdered.

In another embodiment of the invention, the homogeneous powdered mixture is prepared in a $Si_3N_4$ pot in an attrition mill along with $Si_3N_4$ balls of size around 2 to 3 mm, wherein the ball: powder ratio is in the range of 6:1 to 9:1, and wherein the milling is done in a liquid medium of acetone for which the water content is 0.2%.

In yet another embodiment of the invention, the ball to powder ratio during milling is preferably around 7:1.

In another embodiment of the invention, the attrition milling is done for a time period in the range of 2 to 8 hours.

In another embodiment of the invention, the green compacts are formed by isostatically pressing in a rubber mould at a pressure in the range of 65 to 350 MPa.

In a further embodiment of the invention, the sintering of the green compacts is carried out in a graphite resistant heating furnace.

DETAILED DESCRIPTION OF THE INVENTION

The present invention provides a process for the manufacture of dense neodymium stabilised $\beta$-$Si_3N_4$-$\alpha$-SiAlON composite. The composite is prepared by first preparing a homogeneous powdered mixture essentially consisting of 49 to 63 mole % $Si_3N_4$, 2.5 to 3.5 mole % $Al_2O_3$, 29 to 43 mole % AlN, 2.1 to 2.9 mole % $SiO_2$ and 3.1 to 4.9 mole % $Nd_2O_3$, mixed in proportion to make a total of 100 mole to obtain a mixed powdered batch. This powdered batch is then passed through 100 mesh followed by drying. The sieved and dried powder is pressed to form green compacts which are then subjected to sintering to obtain the dense neodymium stabilised $\beta$-$Si_3N_4$-$\alpha$-SiAlON composite. The sintering of the green compacts is carried out at a temperature in the range of 1700° to 1900° C., in nitrogen atmosphere. The starting materials used are pure and powdered. The homogeneous powdered mixture is prepared in a $Si_3N_4$ pot in an attrition mill along with $Si_3N_4$ balls of size around 2 to 3 mm, wherein the ball:powder ratio is in the range of 6:1 to 9:1, and wherein the milling is done in a liquid medium of acetone for which the water content is 0.2%. The ball to powder ratio during milling is preferably around 7:1. The attrition milling is done for a time period in the range of 2 to 8 hours. The green compacts are formed by isostatically pressing in a rubber mould at a pressure in the range of 65 to 350 MPa. The sintering of the green compacts is carried out in a graphite resistant heating furnace.

In the process of the present invention the sintering is found to be enhanced in $\beta$-$Si_3N_4$-$\alpha$-SiAlON compositions when selected from the system $Si_3N_4$—$Al_2O_3$.AlN—$Nd_2O_3$.9AlN—$SiO_2$. The starting material of the present invention constitutes a synergistic composition consisting of $Si_3N_4$—$Al_2O_3$.AlN, $SiO_2$ and $Nd_2O_3$, as described and claimed in our co-pending patent application Ser. No. 10/974/013. It is believed that the mechanism is as follows: in general, the sintering of the $\alpha$-$\beta$ SiAlON materials is difficult primarily due to the presence of some secondary intermediate crystalline phases. In cases of both yttrium as well as some rare earth doped compositions, the melilite phase, $M_2O_3$.$Si_3N_4$ (M=Y, Yb, Dy, Sm, Nd, etc.) often containing aluminium in solid solution, occur frequently together with $\alpha$-SiAlON in the intermediate sintering temperature range. The phase absorbs large amount of the doping element and becomes competitive for the volume fraction of the liquid phase present thereby hindering densification and the precipitation of $\alpha$-SiAlON as well. The final densification of the material therefore becomes dependent on the dissociation temperatures of the melilite which promotes the amount of the liquid phase once again at high temperature so that the sintering proceeds. The extent of the melilite phase formation is favoured when the starting composition is taken in the nitrogen rich side of the compositional zone. It may be believed that the introduction of $SiO_2$ in the starting composition disfavours the formation of the nitrogen rich crystalline phases like melilite etc. and also favours the formation of a larger amount of liquid during sintering thereby promoting an improved densification at comparatively lower temperature with respect to the compositions without $SiO_2$.

The novelty of the present invention is that the product obtained has high hardness and high fracture toughness. This has been made possible by the inventive step of selecting the compositional zone of the present process from the system $Si_3N_4$—$Al_2O_3$.AlN—$Nd_2O_3$.9AlN—$SiO_2$, resulting in $\beta$-$Si_3N_4$-$\alpha$-SiAlON as single crystalline phase with excellent sinterability and possesses a final density value of not less than 98% of theoretical in the temperature range >1750° C.

Thus the present invention relates to a novel process of making dense neodymium stabilised $\beta$-$Si_3N_4$-$\alpha$-SiAlON composites by the inventive step of selection of a range of new synergistic compositions different from other processes resulting into dense product of the order of >98% theoretical density with the advantages such as cost effectiveness, high hardness and high fracture toughness.

The process of the present invention for making dense neodymium stabilised $\beta$-$Si_3N_4$-$\alpha$-SiAlON composite is described below in detail:

1. Pure and powdered $\alpha$-$Si_3N_4$, $Al_2O_3$, AlN and $Nd_2O_3$ were taken as starting materials.
2. Accurately weighed appropriate proportions of starting materials were taken in $Si_3N_4$ pot in an attrition mill along with $Si_3N_4$ balls (size around 2 to 3 mm) for attrition milling wherein the ball:powder ratio were kept in the range of 6:1 to 9:1, preferably around 7:1 and wherein the milling was done in a liquid medium of acetone for which the water content was 0.2%. The milling time was ranging between 2 to 8 hours.
3. After milling, the powder was separated from the balls through sieving and was dried.
4. The milled powder was taken in a rubber mould and was isostatically pressed with pressure ranging from 65 to 350 MPa.
5. The pressed green compacts were taken in a graphite resistance heating furnace and were fired at a temperature in the range of 1700° to 1900° C., in nitrogen gas atmosphere.

The following examples are given by way of illustration of the present invention and should not be construed to limit the scope of the invention:

EXAMPLE 1

A composition containing $Si_3N_4$— 53.3 mole %, $Al_2O_3$— 2.6 mole %, AlN— 37.7 mole %, $Nd_2O_3$— 4 mole % and $SiO_2$— 2.4 mole %, was attrition milled for 3 h, dried, cold pressed under isostatic pressure and was fired at 1750° C. for 2 h in a nitrogen gas atmosphere under a gas pressure of 1 MPa. The linear shrinkage was 15.72%, the firing weight loss was 2.14%. The fired density was 98.06% of the theoretical value. The $\beta$-$Si_3N_4$:$\alpha$-SiAlON phase ratio is lesser than 1:5.

EXAMPLE 2

A composition containing $Si_3N_4$— 53.3 mole %, $Al_2O_3$— 2.6 mole %, AlN— 37.7 mole %, $Nd_2O_3$— 4 mole % and $SiO_2$— 2.4 mole %, was attrition milled for 3 h, dried, cold pressed under isostatic pressure and was fired at 1800° C. for 2 h in a nitrogen gas atmosphere under a gas pressure of 1 MPa. The linear shrinkage was 16.11%, the firing weight loss was 2.2%. The fired density was 98.64% of the theoretical value. The $\beta$-$Si_3N_4$:$\alpha$-SiAlON phase ratio is lesser than 1:5.

EXAMPLE 3

A composition containing $Si_3N_4$— 53.3 mole %, $Al_2O_3$— 2.6 mole %, AlN— 37.7 mole %, $Nd_2O_3$— 4 mole % and $SiO_2$— 2.4 mole %, was attrition milled for 3 h, dried, cold pressed under isostatic pressure and was fired at 1825° C. for 2 h in a nitrogen gas atmosphere under a gas pressure of 1 MPa. The linear shrinkage was 16.13%, the firing weight loss was 2.28%. The fired density was 98.76% of the theoretical value. The $\beta$-$Si_3N_4$:$\alpha$-SiAlON phase ratio is lesser than 1:5.

EXAMPLE 4

A composition containing $Si_3N_4$— 53.3 mole %, $Al_2O_3$— 2.6 mole %, AlN— 37.7 mole %, $Nd_2O_3$— 4 mole % and $SiO_2$— 2.4 mole %, was attrition milled for 3 h, dried, cold pressed under isostatic pressure and was fired at 1850° C. for 2 h in a nitrogen gas atmosphere under a gas pressure of 1 MPa. The linear shrinkage was 16.32%, the firing weight loss was 2.29%. The fired density was 98.84% of the theoretical value. The hardness of the final product is 18.6 GPa. The fracture toughness of the final product is 4.7 MPa·m$^{1/2}$. The $\beta$-$Si_3N_4$:$\alpha$-SiAlON phase ratio is lesser than 1:5.

EXAMPLE 5

A composition containing $Si_3N_4$— 53.3 mole %, $Al_2O_3$— 2.6 mole %, AlN— 37.7 mole %, $Nd_2O_3$— 4 mole % and $SiO_2$— 2.4 mole %, was attrition milled for 3 h, dried, cold pressed under isostatic pressure and was fired at 1900° C. for 2 h in a nitrogen gas atmosphere under a gas pressure of 1 MPa. The linear shrinkage was 16.19%, the firing weight loss was 2.71%. The fired density was 98.81% of the theoretical value. The $\beta$-$Si_3N_4$:$\alpha$-SiAlON phase ratio is lesser than 1:5.

EXAMPLE 6

A composition containing $Si_3N_4$— 49.06 mole %, $Al_2O_3$— 2.75 mole %, AlN— 41.50 mole %, $Nd_2O_3$— 4.50 mole % and $SiO_2$— 2.19 mole %, was attrition milled for 3 h, dried, cold pressed under isostatic pressure and was fired at 1750° C. for 2 h in a nitrogen gas atmosphere under a gas pressure of 1 MPa. The linear shrinkage was 16.14%, the firing weight loss was 1.98%. The fired density was 98.22% of the theoretical value. The $\beta$-$Si_3N_4$:$\alpha$-SiAlON phase ratio is greater than 3:1.

EXAMPLE 7

A composition containing $Si_3N_4$— 49.06 mole %, $Al_2O_3$— 2.75 mole %, AlN— 41.50 mole %, $Nd_2O_3$— 4.50 mole % and $SiO_2$— 2.19 mole %, was attrition milled for 3 h, dried, cold pressed under isostatic pressure and was fired at 1800° C. for 2 h in a nitrogen gas atmosphere under a gas pressure of 1 MPa. The linear shrinkage was 16.29%, the firing weight loss was 1.98%. The fired density was 98.39% of the theoretical value. The $\beta$-$Si_3N_4$:$\alpha$-SiAlON phase ratio is greater than 3:1.

EXAMPLE 8

A composition containing $Si_3N_4$— 49.06 mole %, $Al_2O_3$— 2.75 mole %, AlN— 41.50 mole %, $Nd_2O_3$— 4.50 mole % and $SiO_2$— 2.19 mole %, was attrition milled for 3 h, dried, cold pressed under isostatic pressure and was fired at 1850° C. for 2 h in a nitrogen gas atmosphere under a gas pressure of 1 MPa. The linear shrinkage was 16.38%, the firing weight loss was 2.09%. The fired density was 98.44% of the theoretical value. The $\beta$-$Si_3N_4$:$\alpha$-SiAlON phase ratio is greater than 3:1.

EXAMPLE 9

A composition containing $Si_3N_4$— 49.06 mole %, $Al_2O_3$— 2.75 mole %, AlN— 41.50 mole %, $Nd_2O_3$— 4.50 mole % and $SiO_2$— 2.19 mole %, was attrition milled for 3 h, dried, cold pressed under isostatic pressure and was fired at 1900° C. for 2 h in a nitrogen gas atmosphere under a gas pressure of 1 MPa. The linear shrinkage was 16.18%, the firing weight loss was 2.22%. The fired density was 98.41% of the theoretical value. The $\beta$-$Si_3N_4$:$\alpha$-SiAlON phase ratio is greater than 3:1.

The Main Advantages of the Present Invention are:
1. The sintered material prepared using this process displays high hardness which makes it ideal for use as engineering components in areas where abrasive wear is dominant.
2. The sintered material prepared using this process possesses other important mechanical property like fracture toughness which is acceptable for the use as engineering components.

What is claimed is:

1. A process for the manufacture of dense neodymium stabilized $\beta$-$Si_3N_4$-$\alpha$-SiAlON composite, which process comprises:
   preparing a homogeneous powdered mixture essentially consisting of: 49 to 63 mole % $Si_3N_4$, 2.5 to 3.5 mole % $Al_2O_3$, 29 to 43 mole % AlN, 2.1 to 2.9 mole % $SiO_2$ and 3.1 to 4.9 mole % $Nd_2O_3$, mixed in proportion to make a total of 100 mole to obtain a mixed powdered batch,
   passing the powdered batch through 100 mesh followed by drying, pressing to form green compacts, and subjecting the green compacts to sintering to obtain the dense neodymium stabilized $\beta$-$Si_3N_4$-$\alpha$-SiAlON composite.

2. A process as in claim 1 wherein sintering of the green compacts is carried out at a temperature in the range of 1700° to 1900° C., in nitrogen atmosphere.

3. A process as in claim 1 wherein starting materials used in said preparing step are pure and powdered.

4. A process as in claim 1 wherein the homogeneous powdered mixture is prepared in a $Si_3N_4$ pot in an attrition-mill along with $Si_3N_4$ balls of size around 2 to 3 mm, wherein the $Si_3N_4$ ball powder mixture ratio is in the range of 6:1 to 9:1, and wherein milling in the attrition mill is done in a liquid medium of acetone having a water content of 0.2%.

5. A process as in claim 4 wherein the ball to powder ratio during milling is around 7:1.

6. A process as in claim 4 wherein the attrition milling is done for a time period in the range of 2 to 8 hours.

7. A process as in claim 1 wherein the green compacts are formed by isostatically pressing in a rubber mould at a pressure in the range of 65 to 350 MPa.

8. A process as in claim 1 wherein the sintering of the green compacts is carried out in a graphite resistant heating furnace.

* * * * *